United States Patent [19]

Neumann

[11] 4,414,702
[45] Nov. 15, 1983

[54] CASTOR LOCKING DEVICE FOR ARRESTING THE ROTATION AND THE SWIVELLING OF THE CASTOR

[75] Inventor: Manfred Neumann, Radevormwald, Fed. Rep. of Germany

[73] Assignee: Firm Tente-Rollen Gesellschaft mit beschrankter Haftung Compagnie, Wermelskirchen, Fed. Rep. of Germany

[21] Appl. No.: 329,854

[22] Filed: Dec. 11, 1981

[30] Foreign Application Priority Data

May 16, 1981 [DE] Fed. Rep. of Germany ....... 3119649

[51] Int. Cl.³ ............................................ B60B 33/00
[52] U.S. Cl. .................................... 16/35 R; 188/1.12
[58] Field of Search ...................... 16/20, 35 R, 35 D; 188/1.12, 29, 74

[56] References Cited

U.S. PATENT DOCUMENTS 3,705,438 12/1972 Stosberg et al. .................... 16/35 R
3,988,800 11/1976 Sachser ............................... 16/35 R

FOREIGN PATENT DOCUMENTS 2721375 11/1978 Fed. Rep. of Germany ..... 16/35 R

*Primary Examiner*—Fred Silverberg
*Attorney, Agent, or Firm*—Sprung, Horn, Kramer & Woods

[57] ABSTRACT

A swivel castor having a locking device to arrest rotation of its wheel and/or swivelling of its fork, the device comprising a mounting sleeve and, extending therethrough and through the fork head, an axially movable locking pin having a vertically adjustable top member acted on by a cam received in the mounting sleeve. The top member of the locking pin is guided in the mounting sleeve so as to be axially movable and non-rotatable and is prevented from co-rotating with the locking pin by way of the mounting sleeve. The top member is vertically movable and adjustable by way of the screw thread by rotation of the locking pin relative to the mounting sleeve as for example, by rotation of the fork head.

5 Claims, 14 Drawing Figures

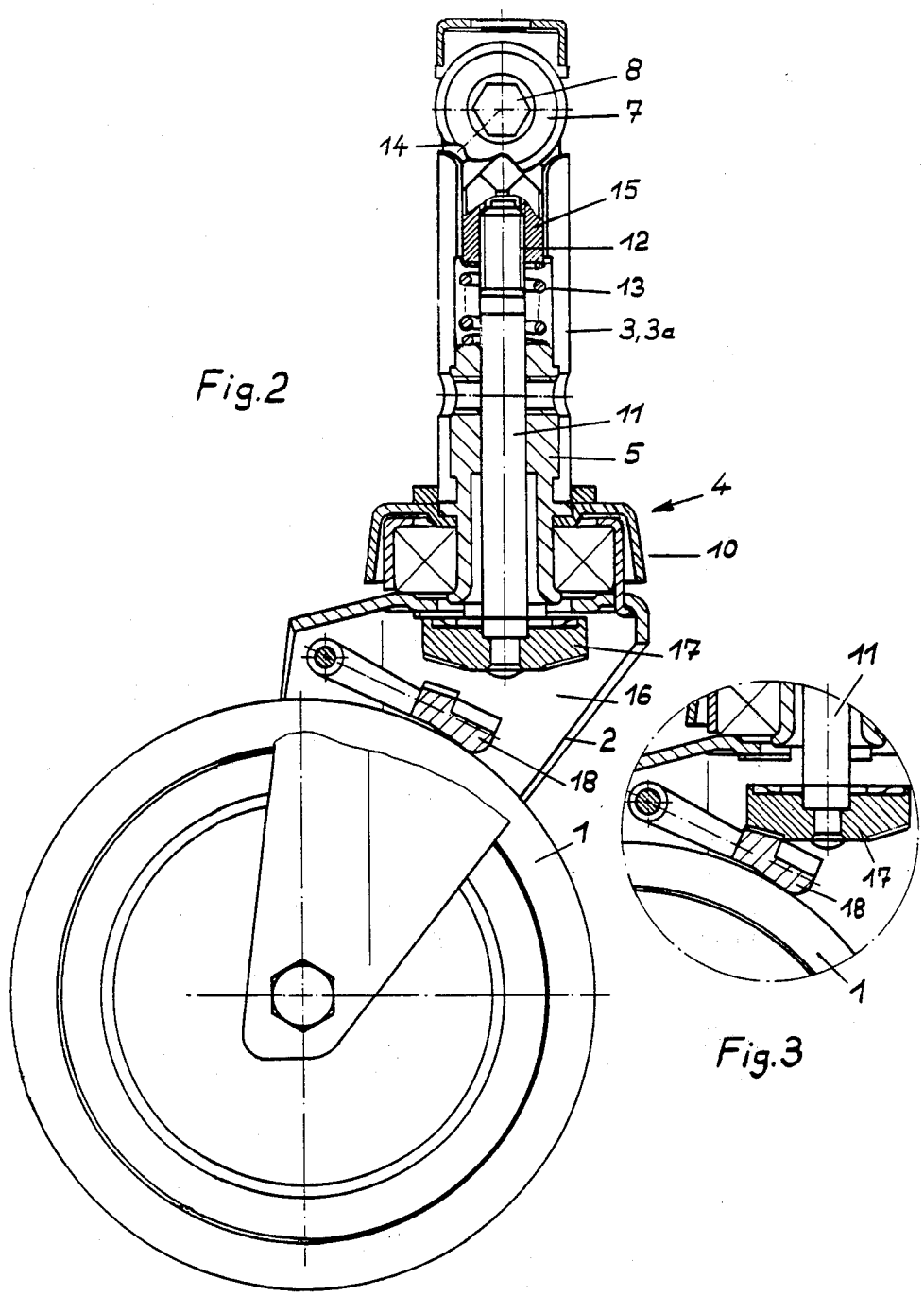

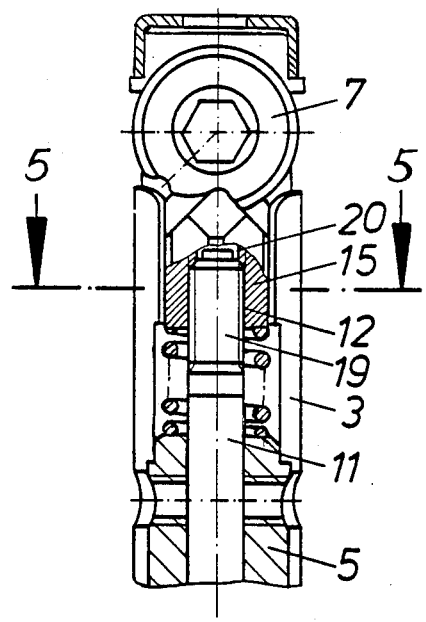
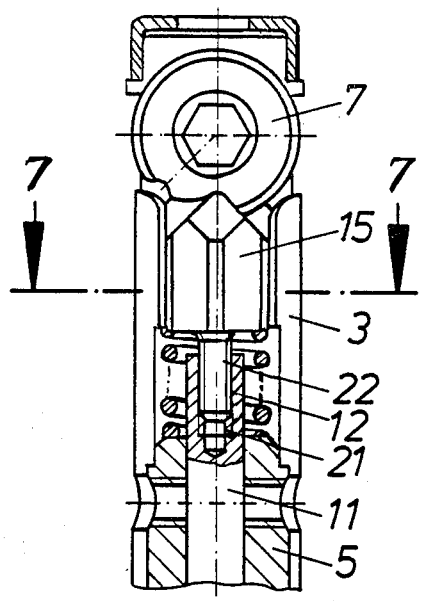
Fig. 4           Fig. 6
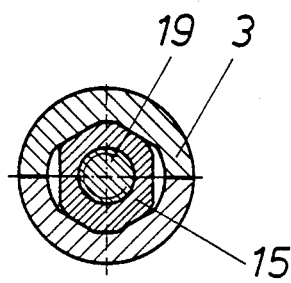
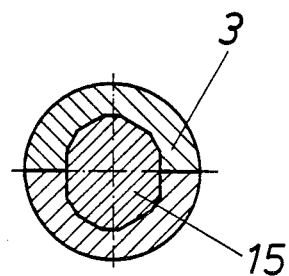
Fig. 5           Fig. 7

CASTOR LOCKING DEVICE FOR ARRESTING THE ROTATION AND THE SWIVELLING OF THE CASTOR

The invention relates to a castor having a locking device for arresting its wheel. In the case of a pedestal castor, the locking device serves to arrest rotation of the wheel. In the case of a swivel castor, the locking device can be used to inhibit swivelling of the castor fork and therefore of the wheel. The locking device associated with a swivel castor can also be used to completely arrest rotation of the wheel and swivelling of the castor fork and therefore of the wheel. A locking device of this kind for arresting wheel rotation and/or wheel fork swivelling comprises an axially movable locking pin which extends through the fork head and through the castor mounting pin, a cam or the like being operative on the top part of the locking pin. Movement thereof axially brings locking members disposed in the hollow of the wheel fork into engagement with one another and thus causes wheel rotation and/or swivelling to be arrested.

Castors of this kind usually form part of centrally lockable castors, of use more particularly for mobile hospital beds. Centrally lockable castors of this kind are usually operated from a central locking mechanism through the agency of a linkage controlling the cams acting on the pins for locking the castors. If operation is to be satisfactory and all the castors of the bed or other device or appliance are to be adjusted consistently despite tolerances, adjustment work is necessary.

To facilitate adjustment, German Gebrauchsmuster No. 7 016 058 discloses the idea of making the castor mounting pin in the form of a sleeve and of accommodating and mounting the cam or the like therein so that the cam becomes a component of the castor. The castor can therefore be adjusted by the maker during assembly to ensure direct co-operation between the locking pin and the cam or the like. For the purposes of such adjustment the axially movable locking pin has an axial screw thread with a vertically adjustable top member in the form of a commercially available cap nut which is first adjusted, then locked by means of a lock nut, a camming surface of the cam acting on such member. The castor is therefore adjusted by the maker ready for fitting, and so tolerances in the bed frame or the like do not impair the operation.

However, in the course of time wear affects the wheel tires, the actuating elements, more particularly the cam, and the locking members of the castor locking device, so that readjustment may be needed after relatively lengthy use. To obviate the need to dismantle the castor from the bottom of the leg of the bed frame or the like, it is known from German Gebrauchsmuster Specification No. 7 837 296 for the brake element received in the hollow of the castor fork to have an adjusting mechanism. The latter increases the cost of the castor and readjustment calls for skill and the use of a tool.

It is the object of the invention to obviate the need for any such additional adjusting mechanism and so to simplify readjustment of the castor that work can be carried out as required by unskilled labour without any special tool.

The invention solves the problem by a special way of arresting rotation of the adjustable top member of the locking pin, the screw thread vertically adjustable top member of the axially movable locking pin being so disposed thereon as to be always loosely adjustable—i.e., not locked by a lock nut during assembly of the castor.

The novel castor which has a locking device to arrest rotation of its wheel and or swivelling of its fork, the locking device comprising a mounting sleeve and, extending therethrough and through the fork head, an axially movable locking pin which for adjustment purposes has an axial screw thread having a vertically adjustable top member acted upon by a cam or the like disposed in the mounting sleeve, is characterised according to the invention in that the top member of the locking pin is so guided in the mounting sleeve as to be axially movable and non-rotatable and is prevented from co-rotating by means of the mounting sleeve, and the top member can be moved vertically and adjusted by rotation of the locking pin and of its screw thread in the mounting sleeve.

Since the freely axially movable top member of the locking pin disposed inside the mounting sleeve is retained thereby as by a tool, the castor can be readjusted as necessary by means of such top member, despite its inaccessibility, just by adjusting the castor fork head by hand in the mounting sleeve in one or the other direction, there being no need to dismantle the castor from the bottom of the leg of the bed frame or the like. All that is necessary for this readjustment is to temporarily slacken or unscrew the securing screw in the bottom of the leg.

A rugged form of the invention is characterised in that the locking pin has a screw thread pin as adjusting screw thread and the vertically adjustable top member has a corresponding internal screw thread. Conversely, the locking pin can be formed with a tapped bore as adjusting screw thread and the vertically adjustable top member can have a corresponding screw thread pin. Fine adjustment is possible if the adjusting screw thread is a fine pitch screw thread.

Since the adjustable top member of the locking pin is so retained by the mounting sleeve in the interior thereof as to be non-rotatable, the invention makes it possible for there to be between the cam and the adjustable top member of the axially movable locking pin not just a point contact but a relatively widge edge contact, a feature which is advantageous for transmitting substantial actuating pressures and which reduces wear of the camming surface of the cam.

In a further development along these lines of the underlying idea of the invention, the novel castor is characterised in that the top member non-rotatably guided by the mounting sleeve tapers towards the top to give a ridge adapted to engage with the camming surface of the cam.

This feature enables the apex of the top member of the locking pin to follow the shape of the camming surface of the cam more intimately, with the result not only that operation of the locking device becomes more accurate but also that the camming surface of the cam can now be shaped for a different pattern of actuating sequences, with a profiling such that the various locking operations occur with precision.

Embodiments of the invention as applied to a fully lockable castor for hospital beds are diagrammatically shown in the drawings wherein:

FIG. 2 is a view in section showing just the castor of FIG. 1 in the unlocked state;

FIG. 3 is a detail in section showing total locking of the castor of FIG. 2;

FIGS. 4 and 5 are details, in vertical section and cross-section respectively, of the adjustable top member of the locking pin in an embodiment with an internal screw thread on a screw thread portion of the locking pin;

FIGS. 6 and 7 are details, in vertical section and cross-section respectively, of the adjustable top member of the locking pin in an embodiment with a screw thread pin in an internally screw thread portion of the locking pin;

In the embodiment in the form of a totally lockable castor for hospital beds, the castor has the locking device for arresting at choice rotation of the wheel 1 and/or swivelling of the castor fork 2.

Figure 1:
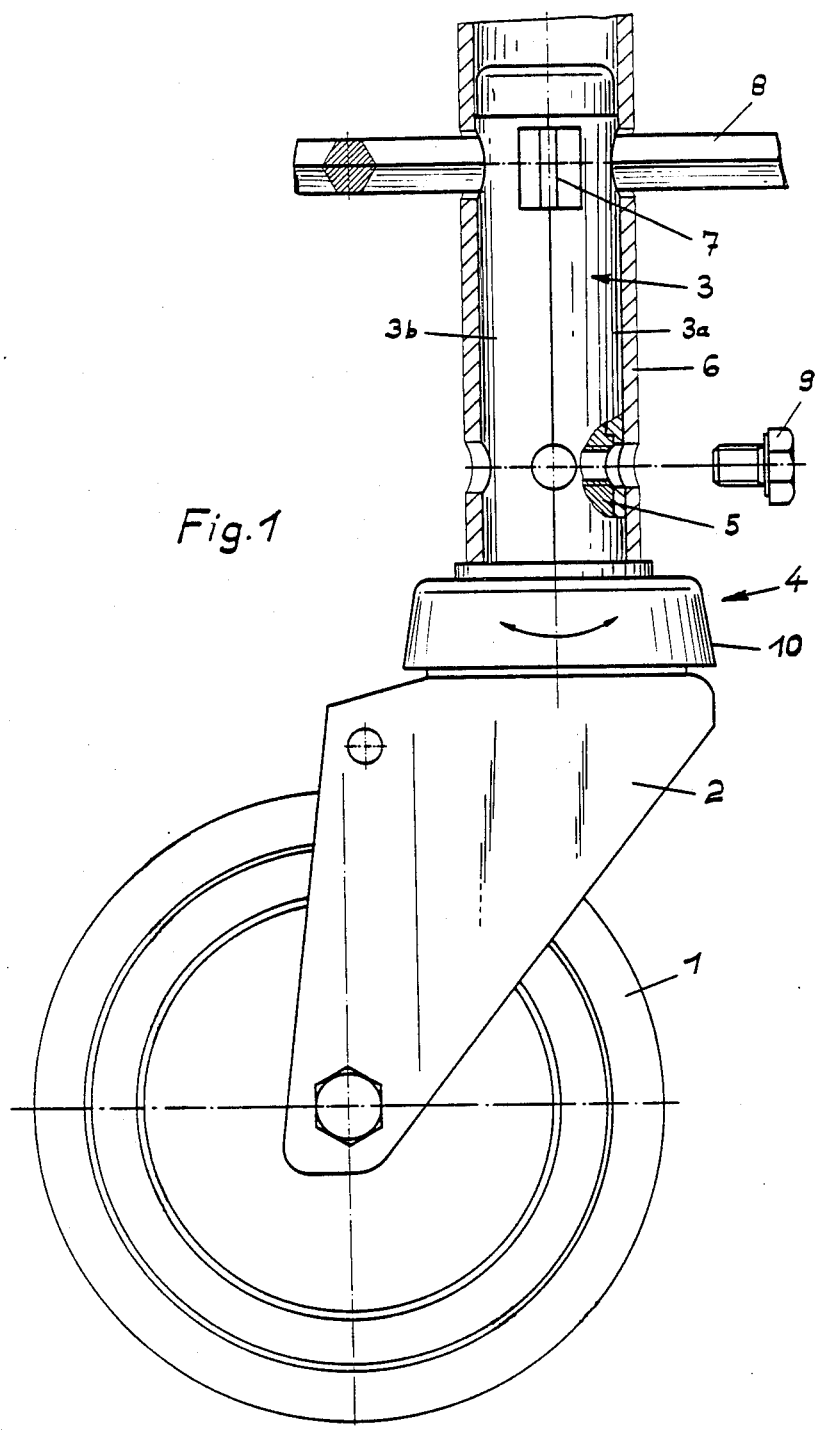
FIG. 1 shows the castor fitted in the bottom of the leg of a bed frame with a control linkage.
Figure 10:
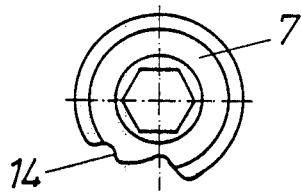
FIGS. 8-11 show the adjustable elements for the embodiment of FIG. 4, FIG. 11 showing the locking pin top member of FIG. 9 in side elevation.
Figure 14:
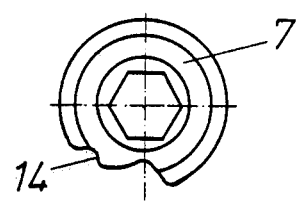
FIGS. 12-14 show the adjustable elements for the embodiment shown in FIG. 6.
Figure 11:
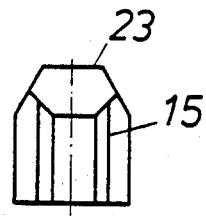

Referring to FIG. 1, the castor has a mounting sleeve 3 combined in this embodiment from two half-shells 3a, 3b which engage around a fork head pin 5 associated with a fork head 4 of the castor. The same is mounted at the bottom of leg 6 of a hospital bed frame by means of the mounting sleeve 3. Disposed at the top thereof is a cam 7 formed with a profiled central aperture through which an actuating rod 8 of the central control mechanism of the bed extends, rod 8 having in this embodiment a hexagonal cross-section. When a securing screw 9 has been unscrewed, fork head pin 5 can be turned as required inside the mounting sleeve 3 just by rotating the fork head 4 by hand in one or the other direction by means of its protecting cap 10.

Figure 8:
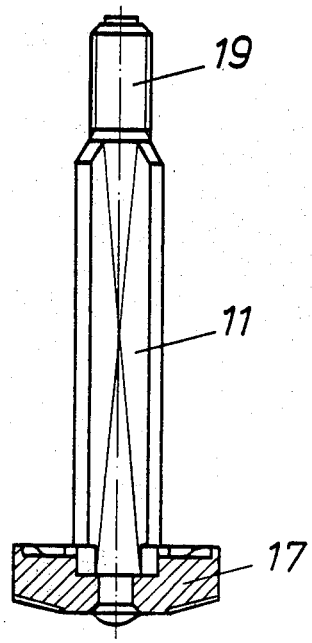
Figure 12:
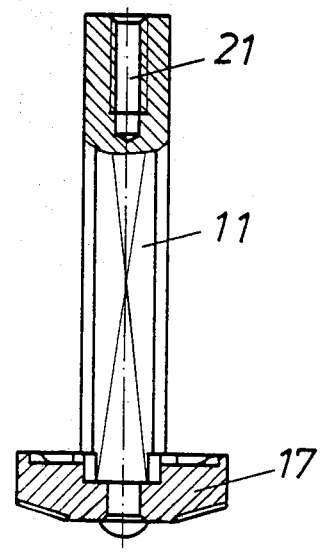

Referring to FIGS. 2 and 3, the castor locking device has a vertically axially movable locking pin 11 which extends through fork head 4 and mounting sleeve 3. As can be seen in FIGS. 8 and 12, pin 11 is bevelled laterally and so cannot rotate in the correspondingly shaped fork head pin 5. For adjustment of its length the locking pin 11 has an axial screw thread 12, embodied in the present case as a fine-pitch screw thread, and a top member 15 which has a corresponding screw thread and which can be adjusted vertically by means of the screw thread 12. Pin 11 is biased by a spring 13 which is disposed between the fork head pin 5 and the top member 15 and which applies a permanent upwards bias to pin 11 so that the rotatable cam 7 can act by way of its camming surface 14 on the top member 15. The locking member is in the form of a mushroom-shaped head 17 having bevelled teeth on its end surface and non-rotatably riveted to the bottom end of pin 11 in hollow 16 of fork 2. When cam 7 forces pin 11 down, head 17 engages with the matching teeth of a pawl 18 pivotally mounted, to form the corresponding locking member, in hollow 16 of fork 2 (FIG. 3), so that the swivelling movement of fork 2 is arrested. When the cam 7 forces locking pin head 17 with even greater force onto pawl 18, the same also acts as a brake element which arrests rotation of wheel 1, so that the castor is fully locked.

Locking pin top member 15 is so guided by an appropriate shaping of the inner wall of the mounting sleeve 3 as to be axially movable but not turnable. The top member 15, since it cannot turn inside the mounting sleeve 3, is prevented thereby from co-rotating with the locking pin 11 when the same is turned (FIGS. 5 and 6). Consequently, when the locking pin 11 is turned, all that the top member 15 can do is to move axially up or down along the screw thread 12, so that the top member 15 is vertically movable, and therefore adjustable, by rotation of the locking pin 11 and of its screw thread 12 in the mounting sleeve 3.

Since the freely axially movable locking pin top member 15 is retained inside the mounting sleeve 3 by the latter as by a tool (FIGS. 5 and 7), to readjust the castor the vertically adjustable member 15 can readily be acted on, despite its inaccessible position inside the pin 3, by rotating the fork head 4 in one or the other direction in the pin 3 manually by means of its protective cap 10, without any need to dismantle the castor from the bottom of the bed frame leg 6 (FIG. 1). All that is necessary as preparation for this readjustment is to unscrew the securing screw 9 from the fork head pin 5 and the bed leg 6.

Figure 9:
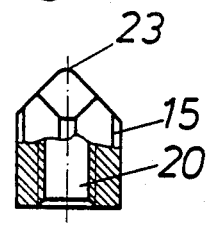
Figure 13:
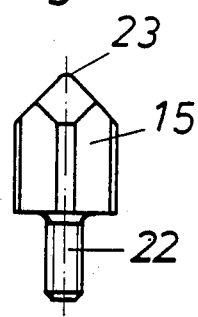

In the embodiment shown in FIGS. 2 and 4 the adjusting screw thread 12 of the locking pin 11 is in the form of a screw thread portion 19, the vertically adjustable top member 15 having a corresponding internal screw thread 20 (FIGS. 8 and 9). In the embodiment shown in FIG. 6, the locking pin 11 is formed with a tapped bore 21 as adjusting screw thread 12, the vertically adjustable top member 15 having in this case a corresponding externally screw thread portion 22 (FIGS. 12 and 13). In both cases the adjusting screw thread 12 is a fine-pitch screw thread, for the sake of fine adjustment.

In these embodiments the locking pin top member 15 tapers towards the top (FIGS. 9 and 13) to give a ridge-like edge 23 adapted to engage accurately with the contours of camming surface 14 and follows such contours accurately.

I claim:

1. In a castor having a locking device to arrest rotation of its wheel and/or swivelling of its fork, the improvement wherein the device comprises a mounting sleeve, an axially movable and rotatable locking pin extending through the mounting sleeve and through its fork head, said locking pin having an axial screw thread at its top portion and a vertically adjustable, non-rotatable top member threadedly mounted thereon, a cam disposed in the mounting sleeve and acting on the top member, means connected to the locking pin for rotating the locking pin relative to the mounting sleeve wherein the mounting sleeve has means guiding the top member for axial movement while preventing corotation with the locking pin, whereby the top member can be moved vertically and adjusted vertically by way of the screw thread by rotation of the locking pin relative to the mounting sleeve.

2. A castor according to claim 1, wherein the locking pin is externally screw threaded and the vertically adjustable top member has an internal screw thread.

3. A castor according to claim 1, wherein the locking pin has an internally threaded bore, and the vertically adjustable top member has an externally threaded pin.

4. A castor according to claim 2 or 3, wherein the screw thread is a fine pitch screw thread.

5. A castor according to claim 1, wherein the top member tapers towards the top to form a ridge for engaging with the cam.

* * * * *